(12) United States Patent
Paulsen et al.

(10) Patent No.: US 8,012,626 B2
(45) Date of Patent: *Sep. 6, 2011

(54) ELECTRODE ACTIVE MATERIAL POWDER WITH SIZE DEPENDENT COMPOSITION AND METHOD TO PREPARE THE SAME

(75) Inventors: Jens Martin Paulsen, Ngatea (NZ); Hong Kyu Park, Daejeon (KR); Mun Ju Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 18 days.

This patent is subject to a terminal disclaimer.

(21) Appl. No.: 12/827,585

(22) Filed: Jun. 30, 2010

(65) Prior Publication Data

US 2010/0264363 A1 Oct. 21, 2010

Related U.S. Application Data

(63) Continuation of application No. 10/584,992, filed as application No. PCT/KR2004/003530 on Dec. 30, 2004, now Pat. No. 7,771,877.

(60) Provisional application No. 60/533,225, filed on Dec. 31, 2003.

(51) Int. Cl.
*H01M 4/50* (2010.01)
*C01G 45/12* (2006.01)

(52) U.S. Cl. ............... 429/231.95; 429/223; 429/224; 423/594.4

(58) Field of Classification Search ............ 429/231.95, 429/223, 231.3, 224, 231.5; 423/594.4, 594.6, 423/599
See application file for complete search history.

(56) References Cited

U.S. PATENT DOCUMENTS

| 5,718,989 | A | 2/1998 | Aoki et al. |
| 6,071,489 | A | 6/2000 | Koehlert et al. |
| 6,103,213 | A * | 8/2000 | Nakamura et al. ......... 423/594.6 |
| 6,241,959 | B1 | 6/2001 | Cho et al. |
| 6,274,273 | B1 | 8/2001 | Cho et al. |
| 2002/0110518 | A1 | 8/2002 | Okuda et al. |
| 2003/0108793 | A1 | 6/2003 | Dahn et al. |

FOREIGN PATENT DOCUMENTS

| EP | 1 189 296 A2 | 3/2002 |
| JP | 7-235292 A | 9/1995 |
| JP | 9-35715 A | 2/1997 |
| JP | 11-86845 A | 3/1999 |

(Continued)

OTHER PUBLICATIONS

Yong Jeong Kim et al., Journal of The Electrochemical Society, 149 (10) pp. A1337-A1341 (2002).

(Continued)

*Primary Examiner* — Jennifer Michener
*Assistant Examiner* — Monique Wills
(74) *Attorney, Agent, or Firm* — Birch, Stewart, Kolasch & Birch, LLP

(57) ABSTRACT

The present invention relates to a powderous electrode active material of lithium transition metal oxide $Li_aM_bO_2$, wherein $0.9<a<1.1$, $0.9<b<1.1$ and M is dominantly transition metal chosen from Mn, Co and Nickel, having particles with a distribution of sizes, where the composition M varies with the size of the particles, and a preparation method thereof. The present invention also relates to an electrochemical cell, particularly rechargeable lithium battery, using the powderous electrode active material.

36 Claims, 3 Drawing Sheets

FOREIGN PATENT DOCUMENTS

| | | | |
|---|---|---|---|
| JP | 2000-12029 | A | 1/2000 |
| JP | 2000-195517 | A | 7/2000 |
| JP | 2001-122626 | A | 5/2001 |
| JP | 2003-7298 | A | 1/2003 |
| JP | 2003-45424 | A | 2/2003 |
| JP | 2003-77459 | A | 3/2003 |
| JP | 2003-203631 | A | 7/2003 |
| JP | 2006-156004 | A | 6/2006 |
| KR | 2002-0025480 | A | 4/2002 |
| WO | WO-2004/027903 | A1 | 4/2004 |

OTHER PUBLICATIONS

Jaephil Cho et al., Journal of The Electrochemical Society, 149 (2), pp. A127-A132 (2002).
Jaephil Cho et al., Journal of The Electrochemical Society, 149 (3), pp. A288-A292 (2002).
Zhaohui Chen et al., Journal of The Electrochemical Society, 149 (12) pp. A1604-A1609 (2002).
Zhaohui Chen et al., Electrochemical and Solid-State Letters, 5 (10), pp. A213-A216 (2002).
Zhaohui Chen et al., Electrochemical and Solid-State Letters, 6, (11), pp. A221-A224 (2003).
Jaephil Cho et al. Electrochemical and Solid-State Letters, 2 (6) pp. 253-255 (1999).
Jaephil Cho et al., Journal of The Electrochemical Society, 148 (10), pp. A1110-A1115 (2001).
Jaephil Cho et al., Electrochemical and Solid-State Letters, 3 (8) pp. 362-365 (2000).
Jaephil Cho et al., Electrochemical and Solid-State Letters, 4 (10), pp. A159-A161 (2001).
Zhaoxiang Wang et al., Journal of The Electrochemical Society, 149 (4), pp. A466-A471 (2002).
Jaephil Cho, Solid State Ionics, 160, (2003), pp. 241-245.
Yabuuchi et al., Journal of Powers Sources 119-121 (2003) pp. 171-174.
S. Jouanneau et al., Journal of The Electrochemical Society, 150 (10), pp. A1299-A1304 (2003).
Zhonghua Lu et al., Journal of The Electrochemical Society, 149 (6), pp. A778-A791 (2002).
Zhaohui Chen et al., Solid-State Letters, 7 (1), pp. 16 (2002).
Japanese Office Action, Appl. No. 2006-546846 dated Dec. 22, 2009, pp. 1-5.

\* cited by examiner

FIG. 3
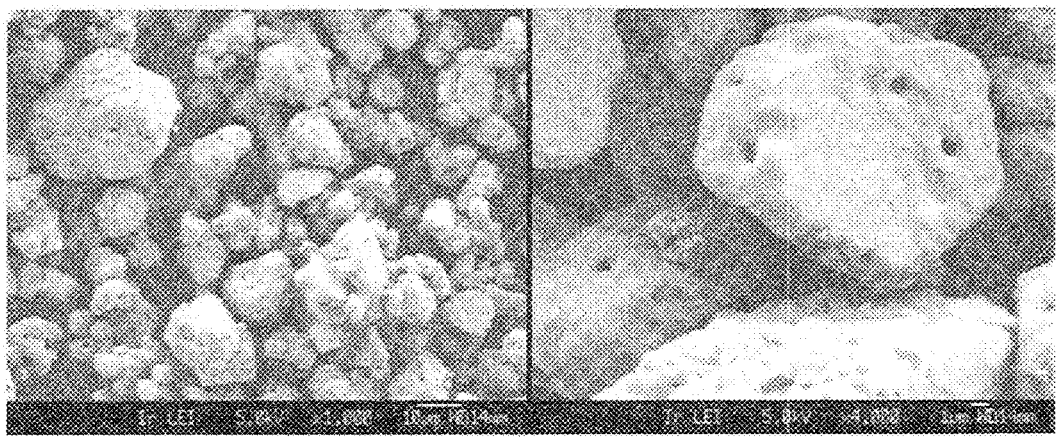
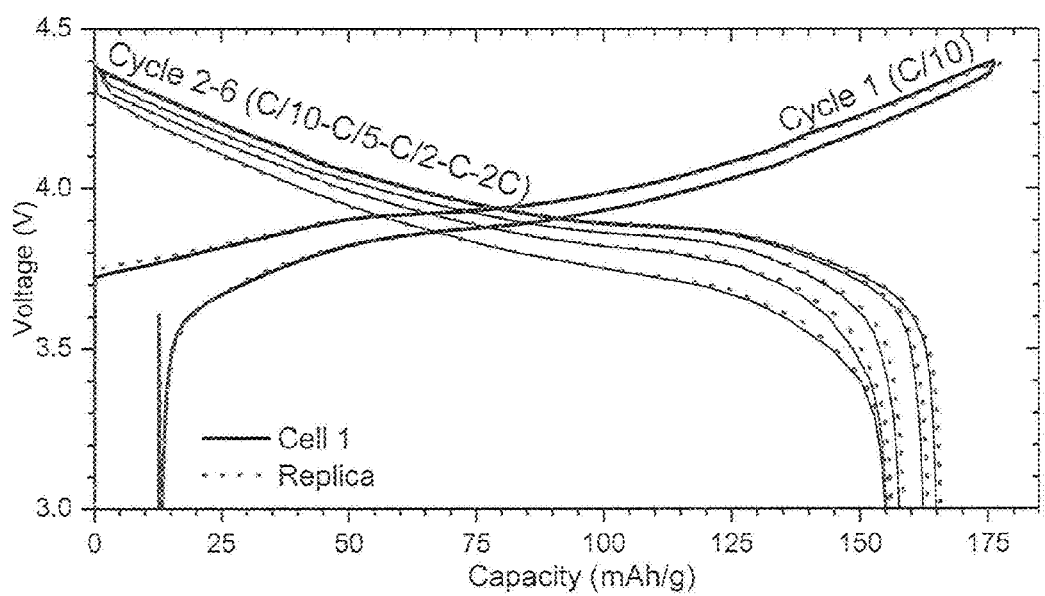
FIG. 4

ELECTRODE ACTIVE MATERIAL POWDER WITH SIZE DEPENDENT COMPOSITION AND METHOD TO PREPARE THE SAME

This application is a Continuation of application Ser. No. 10/584,992 filed on Jun. 29, 2006 now U.S. Pat. No. 7,771,877 and for which priority is claimed under 35 U.S.C. §120. Application Ser. No. 10/584,992 is the national phase of PCT International Application No. PCT/KR2004/003530 filed on Dec. 30, 2004 under 35 U.S.C. §371. Priority is also claimed to U.S. Provisional Application No. 60/533,225, filed on Dec. 31, 2003. The entire contents of each of the above-identified applications are hereby incorporated by reference.

TECHNICAL FIELD

The present invention relates to a powderous electrode active material of lithium transition metal oxide $Li_aM_bO_2$, wherein $0.9<a<1.1$, $0.9<b<1.1$ and M is dominantly transition metal chosen from Mn, Co and Nickel, having particles with a distribution of sizes, where the composition M varies with the size of the particles, and a preparation method thereof. The present invention also relates to an electrochemical cell, particularly rechargeable lithium battery, using the powderous electrode active material.

BACKGROUND ART

A conventional batteries use uniform cathode active materials. The (averaged) composition of small and large particles is the same. Uniform materials also have a similar composition in the inner and outer bulk of a single particle.

$LiCoO_2$, charged to 4.4V or higher voltage is the superior material regarding reversible capacity, gravimetric and especially volumetric energy. Unfortunately, $LiCoO_2$ charged to $\geq 4.4V$ shows high capacity fading, low safety, and in contact with the electrolyte reactivity (electrolyte oxidation) is observed.

Commercial rechargeable lithium batteries almost exclusively apply $LiCoO_2$ as cathode active material. $LiCoO_2$ delivers 137 mAh/g reversible capacity if charged to 4.2V; approx. 155 mAh/g reversible capacity if charged to 4.3V; approx. 170 mAh/g reversible capacity if charged to 4.4V; and approx. 185 mAh/g reversible capacity if charged to 4.5V. An increase of charging voltage to 4.4 or 4.5V could drastically increase the energy density of batteries compared with the standard 4.2V charging. Unfortunately, unprotected $LiCoO_2$ cannot be cycled at >4.3V because of poor capacity retention and poor safety properties.

Coating of $LiCoO_2$ particles has been suggested to protect the surface from unwanted reactions between electrolyte and the charged (=delithiated) $Li_xCoO_2$. The coating approach is for example described by Y. J. Kim et al., J. Electrochem. Soc. 149 A1337, J. Cho et all., J. Electrochem. Soc. 149 A127, J. Cho et al., J. Electrochem. Soc. 149 A288, Z. Chen et all., J. Electrochem. Soc. 149 A1604, Z. Chen, J. Dahn, Electrochem. and solid-state letters, 5, A213 (2002), Z. Chen, J. Dahn, Electrochem. and solid-state letters, 6, A221 (2003), J. Cho et all., Electrochem. and solid-state letters, 2, 607 (1999), J. Cho and G. Kim, Electrochem. and solid-state letters, 2, 253 (1999), J. Cho et all., J. Electrochem. Soc. 148 A1110 (2001), J. Cho et all., Electrochem. and solid-state letters, 3, 362 (2000), J. Cho et all., Electrochem. and solid-state letters, 4, A159, (2001), Z. Whang et all., J. Electrochem. Soc. 149, A466 (2002), J. Cho, Solid State Ionics, 160 (2003) 241-245.

Coating can to some degree improve certain properties like fading and safety. It is however not clear if this is caused by the coating layer. In Z. Chen, J. Dahn, Electrochem. and solid-state letters, 6, A221 (2003) as well as in Z. Chen, J. Dahn, Abs 329, $204^{th}$ ECS Meeting, Orlando, it was shown that a similar treatment (wash+heat) without applying a coating layer causes the same improvement of cycling stability. The improvement however is temporary and vanishes after storage of the cathode.

Different mechanisms cause the fading of cathode active materials like $LiCoO_2$. A first is the precipitation of reaction products of decomposed electrolyte onto the surface of $LiCoO_2$ forming resistive surface layers. A second is the chemical decomposition of $LiCoO_2$ in the presence of electrolyte, thereby changing the outer bulk chemically and structurally. A third is the degradation of bulk $LiCoO_2$ occurring in the absence of electrolyte. This degradation can be a crystal structural degradation (for example transformation to spinel) or a morphological disintegration (electrochemical grinding, causing loss of electrical contact of crystallites). The first and second mechanism can be prevented or reduced by coating. The third requires a modification of the bulk.

Similar as the capacity fading, safety problems are also caused by different mechanism. First, delithiated $LiCoO_2$ tends to oxidize electrolyte, which is a strong exothermic reaction. If the local temperature is high enough, the electrolyte oxidation becomes fast, more heat evolves and the battery might go to thermal runaway. Secondly, delithiated $LiCoO_2$ in the bulk itself is unstable and might collapse towards denser phases, releasing modest amounts of heat. The reaction not involves electrolyte. The first mechanism can be prevented or reduced by coating. The second requires a modification of the bulk.

In most cases the coating accounted for less than 2-5% of the weight of the cathode active material. The stoichiometry of the total cathode active material is only marginally changed, coated active materials are basically uniform materials, because the composition of large and small particles is similar, and the composition of inner and outer bulk is basically the same.

The described coating approaches have not fully solved the stability problem at >4.3V. Particularly unsolved problems are one or more of:

Non complete coating of surface. For example, a wetting of the cathode active material powder with a gel or solution followed by a drying typically does not result in a completely covered surface.

Not enough adhesion between coating layer and cathode active material. During electrode processing and during cycling (change of crystallographic unit cell volume of $LiCoO_2$ as function of state of charge) significant strain occurs. The strain causes a peal-off of the coating layers, leaving large areas unprotected. This problem is especially pronounced if the coating layer and the cathode active material do not form a solid state solution.

Chemical incapability. After coating usually a heating step is applied. During the heating the coating layer might decompose the cathode active material. For example, coating $LiCoO_2$ with lithium manganese spinel is difficult or impossible because the spinel and $LiCoO_2$ contacting each other decompose forming cobalt oxide and $Li_2MnO_3$.

Conduction problems. Insulators (as $Al_2O_3$, $ZrO_2$ . . . ) are suggested for the coating layers. A particle, fully covered by an insulator, is electrochemically inactive. If the surface is fully covered, then the layer has to be extremely thin (to allow "tunneling" of electrons). It is questionable if such thin layers can be achieved and if they will prevent the electrolyte-surface reactions.

Coated layers are to thin to improve the safety.

Sharp two phase boundaries. If the LiCoO$_2$ and the coating layer do not have a solid state solution, then lattice strains are localized at the boundary, which reduces the mechanical stability. A braking of particles during extended cycling is possible.

Complex cathode active materials with layer structure have been disclosed. Some show a better cycling stability than LiCoO$_2$ if cycled at >4.3V, and they also show better safety. Typical examples are layered cathode active materials being solid state solutions within the ternary system, LiMn$_{1/2}$Ni$_{1/2}$O$_2$—LiNiO$_2$—Li[Li$_{1/3}$Mn$_{2/3}$]O$_2$—LiCoO$_2$. In the following a short notation for the transition metal composition will be used, "ABC" refers to a lithium transition metal oxide with transition metal composition M=Mn$_A$Ni$_B$Co$_C$.

Some Examples are:

"110"—LiNi$_{1/2}$Mn$_{1/2}$O$_2$ or Li[Li$_x$(Mn$_{1/2}$Ni$_{1/2}$)$_{1-x}$]O$_2$, x≧0, |x|<<1 (Dahn et al. in Solid State Ionics 57 (1992) 311, or T. Ohzuku, Y. Makimura, 2001 ECS meeting (fall), Abstr. 167)

"442"—LiMO$_2$ or Li[Li$_x$M$_{1-x}$]O$_2$ M=(Mn$_{1/2}$Ni$_{1/2}$)$_{1-y}$Co$_y$, x≧0, |x|<<1, y=0.2 (Paulsen&Ammundsen, 11th International Meeting on Lithium Batteries (IMLB 11), Cathodes II, Ilion/Pacific Lithium)

"111"—LiMn$_{1/3}$Ni$_{1/3}$Co$_{1/3}$O$_2$ (Makimura&Ohzuku, Proceedings of the 41$^{st}$ battery symposium on 2D20 and 2D21, Nagoya, Japan 2000 or N. Yabuuchi, T. Ohzuku, J. of Power sources 2003, (in print)

"118"—LiCo$_{0.8}$Mn$_{0.1}$Ni$_{0.1}$O$_2$ (S. Jouanneau et all., J. Electrochem. Soc. 150, A1299, 2003)

"530"—Li[Li$_{1/9}$Mn$_{5/9}$Ni$_{1/3}$]O$_2$, "530 mod"—Li[Li$_{1/9}$Mn$_{5/9}$Ni$_{1/3}$]O$_{1.75}$ (J. Dahn, Z. Lu, US patent application 2003/0108793A1, Z. Lu et all., J. Electrochem. Soc. 149 (6) A778 (2002))

Despite of some improvements these materials are not truly competitive.

Remaining Problems are One or More of:

High cost: "118" for example has raw materials costing similar as LiCoO$_2$, however, compared to LiCoO$_2$ which can be prepared by cheap routes (solid state reaction) the cost of preparation (typically involving mixed precursors like mixed hydroxides) is much higher.

Low volumetric energy density: Low cobalt materials like "110" or "442" have low Li diffusion constant. To obtain, a sufficient rate performance, powders consisting of particles with smaller crystallites and some porosity of particles are required. The obtained porosity of electrodes is too high. Additionally, the crystallographic density is significantly smaller than LiCoO$_2$ (5.05 g/cm$^3$). 110 has a density of approx. 4.6 g/cm$^3$, "442" has approx. 4.7 g/cm$^3$. The same applies for "530" with a low density of 4.4 g/cm$^3$. cathode active material (like "530") are not stable. They transform to an oxygen and lithium deficient cathode active material at >4.5V during first charge. After discharge a different material "530 mod" is achieved. "530 mod Side reactions: Manganese and lithium rich cathode material like "530" is oxygen deficient and not thermodynamically stable. Even if the electrochemical properties of the resulting material are excellent, the transformation involves the release of oxygen, possibly reacting with the electrolyte and forming undesired gas.

Important for real batteries is not only the gravimetric reversible capacity (mAh/g) but also the energy density (=capacity×average voltage), here especially important is the volumetric energy density (Wh/L) of the electrodes. Essential to achieve a high volumetric energetic density of electrodes is (a) high powder density, (b) a large capacity and (c) high voltage.

LiCoO$_2$ allows achieving powder densities of up to 3.5-4 g/cm$^3$. This corresponds to approx. 70-80% of crystallographic density, or 20-30% porosity. Electrodes of complex layered materials or phosphates usually have a higher porosity. Additionally the crystallographic density of the complex layered materials is 5-12% lower. The crystallographic density of LiFePO$_4$ is 30% lower. The same applies for spinel materials. This further reduces the energy density.

DISCLOSURE OF THE INVENTION

An object of the present invention is to provide an electrode active material, which combines high volumetric and gravimetric energy density with high cycling stability and safety at low cost.

In one aspect, the present invention provides a powderous electrode active material of lithium transition metal oxide Li$_a$M$_b$O$_2$, where 0.9<a<1.1, 0.9<b<1.1 and M is dominantly transition metal chosen from Mn, Co and Nickel, having particles with a distribution of sizes, where the composition M varies with the size of the particles.

In another aspect, the present invention provides a powderous electrode active material of lithium transition metal oxide Li$_a$M$_b$O$_2$, where 0.9<a<1.1, 0.9<b<1.1 and M is transition metal chosen from Mn, Co and Nickel, the particles have a layered crystal structure, having a broad particle size distribution with d90/d10>2, where the composition M varies with the size of the particles.

In still another aspect, the present invention provides a method for preparing the powderous electrode active material with a size-dependent composition, the method comprising the steps of: precipitating at least one transition metal containing precipitate onto seed particles, which have a different transition metal composition than the precipitate; adding a controlled amount of a source of lithium; and performing at least one heat treatment, wherein basically all obtained particles contain a core, originating from a seed, completely covered by a layer originating from precipitate.

BRIEF DESCRIPTION OF THE DRAWINGS

FIG. 3 is a FESEM of the cathode active material prepared in Example 1.

FIG. 4 is a graph showing a first cycle profile and rate performance of the cathode active material of Example 1.

MODE FOR INVENTION

Figure 1:
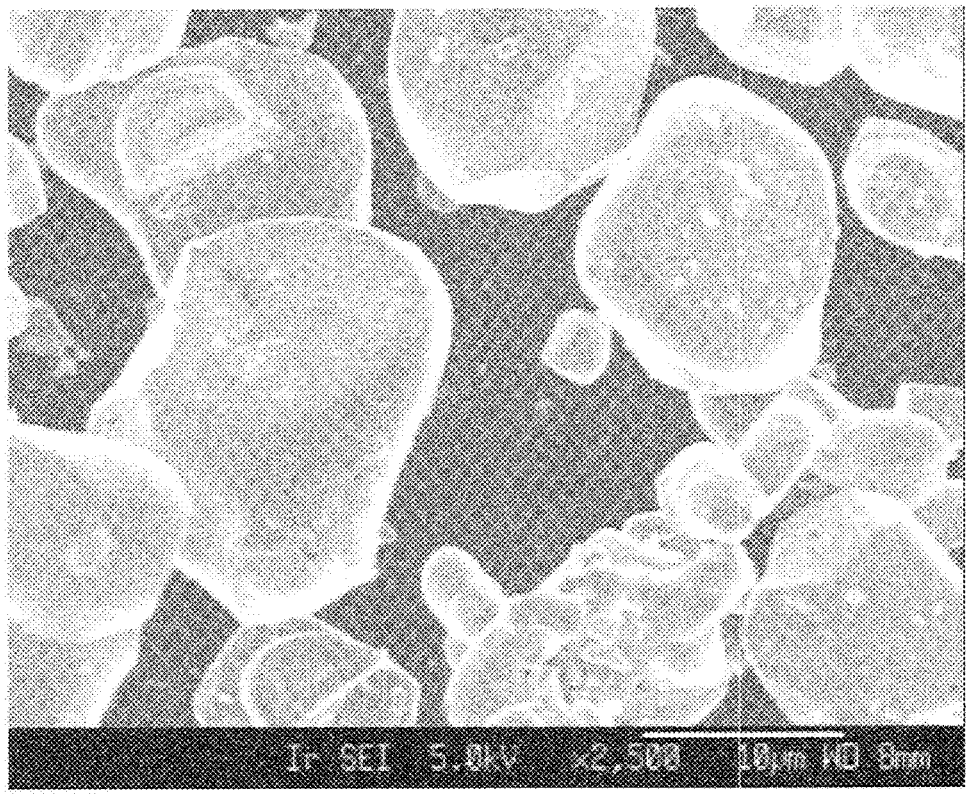
FIG. 1 is a FESEM image of LiCoO$_2$ seed particles used as seed material in Example 1.

In order to provide an electrode active material which combines high volumetric and gravimetric energy density with high cycling stability and safety, the present invention utilizes a "non-uniform approach." The non-uniform approach uses the concept that in order to achieve optimized performance the requirements are different for small and large particles, and furthermore, requirements are different for inner bulk, outer bulk and surface of single particles. Particularly, the requirements for chemical stability in contact with electrolyte, for the lithium diffusion constant, for the electronic conductivity and also for the morphology vary with particle size, and they also vary from the outer bulk to the inner bulk of a single particle.

Contrary to coating, the "non-uniform approach" relates to the whole bulk or at least large parts of the outer bulk. It allows for a principally different and much more radical optimization. Accordingly, the present invention discloses non-uniform materials, where the composition changes significantly.

That is, the non-uniform approach relates to the composition of particles of the powder, where the composition varies with the size of the particles. The non-uniform approach also relates to single particles of the powder, wherein the single particle has a composition different in the inner and outer bulk and surface. The non-uniform approach may relate not only to composition but also to further parameters like morphology.

According to an embodiment of the present invention, there is provided a powderous electrode active material of lithium transition metal oxide $Li_aM_bO_2$, wherein $0.9<a<1.1$, $0.9<b<1.1$ and M is dominantly transition metal chosen from Mn, Co and Nickel, having particles with a distribution of sizes, where the composition M varies with the size of the particles.

Large dense particles have a long lithium diffusion path. Large particles contribute excessive to poor cycling stability if intercalation induced strain is involved. Large particles contribute excessive to poor rate performance if the lithium transport in the solid phase is slow. Small particles have a lager specific surface area. Small particles contribute excessive to low safety and poor cycling stability, if electrolyte reactions are involved.

Accordingly, a powderous electrode active material of the present invention comprises particles of lithium transition metal oxide, wherein the composition of transition metal varies with the size of the particles, for example, the larger particles having a composition the more allowable for fast bulk diffusion, and the smaller particles having a composition ensuring high safety.

It is preferable that the powderous electrode active material according to the present invention has a broad particle size distribution specified that the size ratio of large to small particles exceeds 2, $d90/d10>2$ where d90, the size of large particles, is defined that particles with larger size constitute a fraction of 10% of the total mass of the powder and d10, the size of small particles is defined that particles with smaller size constitute a fraction of 10% of the total mass of the powder. The particle size distribution of powders can be measured by suitable methods known in the art. Suitable methods are for example laser diffraction or sieving by using columns of sieves with different mesh.

Preferably, the single particles of the powderous electrode active material are basically lithium transition metal oxide, and the single particles have a Co content in the transition metal continuously increasing with the particle size. More preferably, the single particles contain further manganese in the transition metal, and have the manganese content continuously decreasing with the particle size. Most preferably, the manganese content is roughly proportional to the inverse of the radius of the particle.

In a special implementation, large particles have a composition near to $LiCoO_2$ (for example "118") allowing for a high Li diffusion constant, thus a sufficient rate performance is achieved. The large particles contribute only a small fraction to the total surface area of the cathode. Therefore, the quantity of heat evolving from reactions with electrolyte at the surface or in the outer bulk is limited; as a result large particles contribute little to poor safety. Small particles have a composition with less cobalt to achieve an improved safety. The lower lithium diffusion constant can be tolerated in small particles without significant loss of rate performance because the solid state diffusion path length is small.

In a cathode active material powder of the present invention, a preferred composition of the smaller particles contains less cobalt and more of stable elements like manganese. The slower bulk lithium diffusion can be tolerated but the stability of the surface is high. In a cathode active material powder of the present invention, a preferred composition of the larger particles contains more cobalt and less manganese because a fast bulk-lithium diffusion is required, whereas a slightly lower stability of the surface can be tolerated.

Preferably, in the powderous electrode active material of lithium transition metal oxide $Li_aM_bO_2$, $M=A_zA'_{z'}M'_{1-z-z'}$, $M'=Mn_xNi_yCo_{1-x-y}$ (where $0\leq y\leq 1$, $0\leq x\leq 1$; $0\leq z+z'<0.1$, $z'<0.02$), A is a metal chosen from Al, Mg, Ti, Cr and A' is a further minor dopant chosen from F, Cl, S, Zr, Ba, Y, Ca, B, Be, Sn, Sb, Na, and Zn.

Preferably, the powderous electrode active material has a layered crystal structure.

In a preferable example of the powderous electrode active material of lithium transition metal oxide $Li_aM_bO_2$ ($0.9<a<1.1$ and $0.9<b<1.1$), M is transition metal chosen from Mn, Co and Nickel, the particles have a layered crystal structure, having a broad particle size distribution with $d90/d10>2$, and the composition M varies with the size of the particles. Preferably, the composition M varies continuously with the size of the particles.

Preferably, in the powderous electrode active material of $Li_aM_bO_2$ with size dependent composition, the averaged transition metal composition is $M=Mn_xNi_y(Co_{1-x-y})$ with $0.35>x0.03$.

Preferably, in the powderous electrode active material of $Li_aM_bO_2$ with size dependent composition, the averaged transition metal composition is $M=Mn_xNi_y(Co_{1-x-y})$ with $x>0.03$ and $x+y<0.7$.

Preferably, in the powderous electrode active material of $Li_aM_bO_2$ with size dependent composition, basically all bulk of all particles has a layered crystal structure, larger particles having a composition $Li_aM_bO_2$ where $M=Mn_xNi_y(Co_{1-x-y})$ with $x+y<0.35$ and smaller particles having a different composition $Li_aM_bO_2$ where $M=Mn_xNi_y(Co_{1-x'-y'})$ with at least 10% less cobalt $(1-x'-y')<0.9*(1-x-y)$ and at least 5% more manganese $x'-x>0.05$.

Electrodes utilizing active materials with very uniform particle size in principle have one preferred, optimized, uniform composition. This however is not feasible, and usually not preferred because the desired higher powder densities are achieved by more complex particle size distributions. In this case only the application of the "non-uniform" principle allows for fully optimization, resulting in a powder with size dependent composition.

A very simple example of a non-uniform cathode active material according to the present invention is a mixture of two different cathode active materials with different particle size distribution. One cathode component has large particles (for example having a distribution centered at $\geq 20$ μm); its composition allows for fast bulk diffusion (for example $LiCoO_2$ or "118"). The other cathode component has small particles (for example having a distribution around 5 μm) and its composition ensures acceptable safety (for example "111" or "442").

Another example of a non-uniform cathode active material according to the present invention is a more complex size-composition distribution, wherein large particles have a composition like $LiCoO_2$ or "118", small particles have a composition like "442" and intermediary sized particles have an intermediary composition like "111", etc. Such cathode active materials can be easily achieved by the method disclosed further below.

A cathode active material which consists of particles with significant open porosity, has one preferred optimized uniform composition. This however is not feasible, and usually not preferred because the desired higher powder densities are achieved by denser, monolithic particles. In this case the application of the "non-uniform" approach allows for fully optimization. This approach takes into account the different requirements for inner bulk and outer bulk and surface.

Accordingly, another embodiment of the present invention provides a powderous electrode active material, wherein larger particles, specified by having a size larger than d50—these larger particles comprise a mass fraction exceeding 50% of the total mass of the powder—have a different composition in the inner bulk and the outer bulk.

Preferably, the inner bulk of larger particles has a composition $Li_aM_bO_2$ where $M=Mn_xN_y(Co_{1-x-y})$ and $x<0.2$.

Preferably, the inner bulk of larger particles has a composition $Li_aM_bO_2$ where $M=Mn_xNi_yCo_{1-x-y}$ with $x+y<0.2$.

There are disclosures about mixtures of cathode active materials (for example U.S. Pat. No. 6,007,947 and U.S. Pat. No. 6,379,842 (Polystor) "Mixed lithium manganese oxide and lithium nickel cobalt oxide positive electrodes"). There are also disclosures about powders being a mixture of $LiCoO_2$ and spinel. These powders are obviously not uniform—particles of the different cathode components have different composition. These disclosures however are unrelated to the "non-uniform approach" of the present invention. The described prior art does not differentiate between performance requirements for large and small particles, and it does not differentiate between requirements for inner bulk, outer bulk and surface of particles. Particularly, each cathode component itself is "uniform", the composition of large and small particles is the same, and the composition of inner bulk, outer bulk and surface is the same.

In a preferable example of the present invention, the inner bulk of larger particles has a higher stoichiometry of cobalt and a lower stoichiometry of manganese than the outer bulk.

In the inner bulk of a single particle having a composition $Li_xMO_2$, to at least 80 w % is cobalt or nickel, preferably. In a further preferred implementation of the present invention, the inner bulk of the particle has a composition near to $LiCoO_2$. The outer bulk is a lithium manganese nickel cobalt oxide.

An example of a non-uniform cathode active material according to the present invention is a mixture of different cathode active materials with different particle size, wherein large particles have a composition "118" in the outer bulk and a higher cobalt content in the inner bulk; small particles have a composition "111" in the inner bulk and "442" in the outer bulk; and intermediary particles have an intermediary averaged composition, also richer in cobalt in the inner bulk. Such cathode materials can be achieved by the method disclosed further below.

Another example of a non-uniform cathode active material according to the present invention is a cathode active materials wherein the composition of particles varies with the size of particles, and, additionally, the single particles have a different morphology in the inner and outer bulk. The particles have a monolithic inner bulk, but the morphology of the outer bulk near to the surface has a morphology which yields an increased surface area. An example is a bulky particle with a structured, i.e. rough or partly porous surface. Such cathode materials can be achieved by the method disclosed further below.

Many further reaching applications of the "non-uniform" principle are possible, but not all can be achieved easily at low cost. Two examples: (1) The porosity of electrodes preferable decreases from the surface towards the current collector, this would allow for faster rates at the same averaged porosity. (2) Safety requirements in the center of a battery are more severe than at the outside (here the evolved heat is faster dissipated). A "non-uniform" improved battery would have a jelly roll, where the (averaged) composition and morphology of the cathode powder would changes from the outside to the inside.

According to still another embodiment of the present invention, there is provided a method for preparing electrode active material particles with a size-dependent composition, the method comprising the steps of: precipitating at least one transition metal containing precipitate onto seed particles, which have a different transition metal composition than the precipitate; adding a controlled amount of a source of lithium; and performing at least one heat treatment, wherein basically all obtained particles contain a core, originating from a seed, completely covered by a layer originating from precipitate.

The inventive method can prepare the powderous electrode active materials with a size-dependent composition at low cost. The method involves a precipitation reaction utilizing seed particles. The seed particles preferably have a non-narrow size distribution. After the precipitation reaction, a precipitate covers the seed particles. The precipitation reaction is characterized that the seed particles have a significantly different transition metal composition than the precipitate. The precipitation reaction is furthermore characterized that the precipitate forms a layer of uniform thickness, covering the seed particles. The precipitate can additionally contain further metal cations, like Al, Mg, Ti, Zr, Sn, Ca and Zn etc. Accordingly, the outer layer originating from the precipitate can contain further at least one metal element chosen from Al, Mg, Ti, Zr, Sn, Ca and Zn.

Typically, a flow of dissolved mixed transition metal salt, and a flow containing a suitable counter-anion (like NaOH or $Na_2CO_3$) are fed to an agitated reactor, which contains a slurry of dispersed seed particles. In a preferred implementation, $LiCoO_2$, or $LiCoO_2$ based materials (for example, $LiMO_2$ where M is transition metal $M=Mn_xNi_yCo_{1-x-y}$, where $x<0.25$ and $y<0.9$) are used as seed particles. Preferably, the particles are monolithic. Structured secondary particles (agglomerates of smaller primary particles) are less desired. After a successful precipitation, a uniform layer of precipitate with sufficient adhesion covers all seeds particles. Preferably, the precipitate contains manganese. More preferably, at least 40 w % of the transition metal of the precipitate is manganese. The amount of the precipitated layer is significant, so that the averaged (transition) metal composition of the particles is significantly different from that of the seed particle. The thickness of the precipitated layer typically is uniform, in this way the average composition of small particles differs from the composition of large particles, yielding the desired size-composition distribution. Furthermore, it is preferred that the precipitate has a low porosity, and covers completely the seed. Basically no particles, not having a seed-particle core are present. To achieve this goal, it is important during precipitation to keep the degree of supersaturation low. Especially important is the choice of reaction conditions like flow rate, pH, temperature, volume, agitation, additives (like ammonia), content of oxygen, thickening, shape of reactor, etc.

Instead of $LiCoO_2$, other materials can be used as seed materials. Preferably, the seed itself has a high energy density, if it would be applied as cathode active material. A possible example is modified $LiNiO_2$ (like Al and/or Co doped $LiNiO_2$). Alternatively, the seed can be a precursor (for example a transition metal oxide), which converts to a cathode active material with high energy density during the heat treatment.

Preferably, the precipitate contains manganese, and the seeds dominantly are monolithic particles chosen from $LiCoO_2$ or $LiMO_2$ where M dominantly is transition metal ($M=A_zM'_{1-z}$, $0 \leq z < 0.05$, A is an additional dopant like Al, Mg, etc. known from the art). The transition metal M' contains at least 75% Co or Ni, $M'=Mn_xNi_yCo_{1-y-x}$, $0<x<0.25$.

Preferably, all obtained particles contain a core, originating from a seed, completely covered by a layer of precipitate.

After precipitation the slurry is washed and dried. Alternatively an equilibration in a salt solutions to remove unwanted ions by ion exchange is possible, followed by wash and dry. After adding a controlled amount of a source of lithium (like $Li_2CO_3$) and mixing, at least one heat treatment follows. During the heat treatment a chemical reaction proceeds. The precipitated layer reacts with lithium and preferable, a lithium transition metal phase with layered crystal structure phase is formed. During the heat treatment also diffusion reaction between layer and seed occurs, which relaxes the transition metal compositional gradient. The sintering conditions are important since excessive sintering would cause a low surface area, and in some cases the "non-uniform" character would be lost. Not enough sintered samples can result in a too high porosity, and a too large surface area, and the gradient between outer phase (originating from the precipitate) and inner phase (originating from the seeds) might be too steep. In a preferred implementation of the present invention, after sintering the cathode powder consists of particles being lithium transition metal oxide with layered crystal structure (typical space group: r–3m).

Preferably, the heat treatment is made in air, the temperature being within the range from 750 to 1050° C., more preferably the temperature being in-between 850-950° C.

The choice of suitable seeds, precipitation and sintering conditions allow to optimize the final cathode powder. The (averaged) composition of particles varies with particle size. Preferably, also the composition varies between inner bulk and outer bulk and surface. A preferable morphology can be achieved. Particularly the surface and the outer bulk near to the surface can be modified without altering the dense monolithic structure of the inner bulk. One preferred example is a smooth surface with low surface area. Another preferred example is a slightly structured surface with larger surface area. The first is desired if safety is of concern, the latter can be preferred if impedance layers are of concern. Many more morphologies can be achieved. Under certain conditions, deep valleys or pin-wholes, penetrating straight into the bulk of the particle can be achieved. This might be desired if large particles with sufficient rate performance are of interest. During sintering, beneficial epitaxi-related effects between the outer phase and the inner phase can be desired.

The inventive method allows to obtain a non-uniform cathode material at lowered cost. In the following the cost of a non-uniform cathode is compared with $LiCoO_2$, low cobalt complex cathodes and high cobalt complex cathodes. $LiCoO_2$ has a medium high price because the cobalt precursors are expensive, but the processing is reasonable cheap. Complex low-Co materials like "111", "442", "530" etc. usually have a medium to medium high price because the precursors are cheaper, but often the processing (co precipitation) is expensive. High Co complex cathodes like "118" are expensive. The precursors (cobalt) are expensive, and the processing (typically precipitation) is expensive as well. Compared to "118" the "non-uniform" cathode materials of this invention have similar or better performance, but can be prepared at lower cost.

The present invention is further described in the following non-limitative examples.

EXAMPLES

Example 1

Preparation of a Powder, Having Particles with Size Dependent Composition

Seed particles: Commercial $LiCoO_2$ not having a small particle size distribution, consisting of monolithic particles (not secondary particles being agglomerates of primary particles) was used as seed material. The $LiCoO_2$ consisted of about 50% by volume of large particles of size between 10-25 my, the d50 being about 17 my, and about 50% by volume smaller particles of size between 3-10 my, the d50 being about 5 my. FIG. 1 shows a FESEM image of the applied powder.

Figure 2:
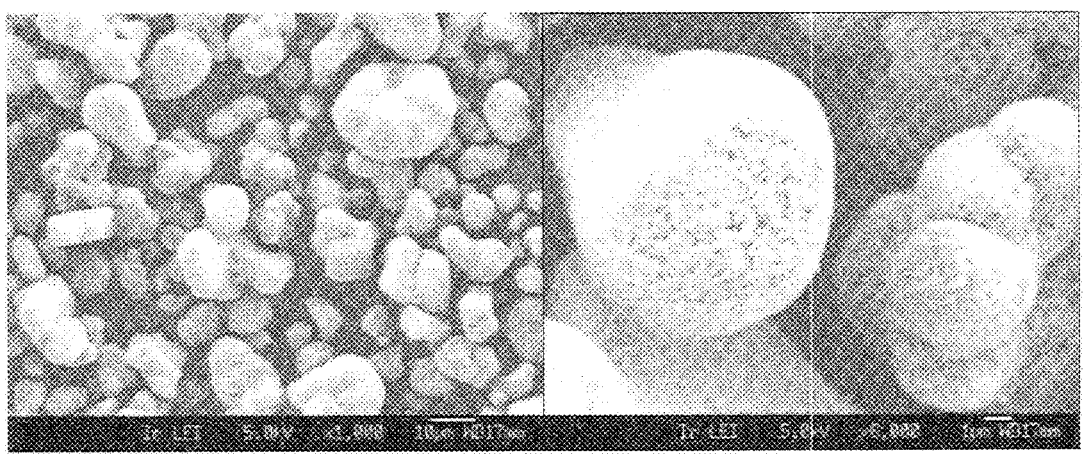
FIG. 2 is a FESEM of LiCoO$_2$ covered with Mn$_{1/2}$Ni$_{1/2}$ mixed hydroxide, achieved after the precipitation in Example 1.

Precipitation: 3 kg of $LiCoO_2$ and 1.4 L of $H_2O$ were added to a 5 L reactor. A flow of 4M NaOH solution and a flow of 2M $MSO_4$ solution ($M=Mn_{1/2}Ni_{1/2}$ "110") were added to the reactor during rigid stirring. The temperature was kept at 95° C., the flow rates were controlled so that the pH was kept stable. After 70 minutes the precipitation was interrupted, clear $Na_2SO_4$ solution was removed from the solution, and the precipitation was continued for another 70 minutes. A total of 0.25 mol $M(OH)_2$ was precipitated per 1 mol $LiCoO_2$. The resulting slurry was decanted, and equilibrated over night in 0.3 M LiOH solution, followed by wash and filtering. The filter cake was dried at 180° C. in air. FIG. 2 shows a FESEM image of the achieved powder.

Reaction: 3.5 g $Li_2CO_3$ was added per 50 g of the above achieved powder and mixed. A solid state reaction was performed at 980° C. for 24 hours. After that, the powder is grinded and sieved, resulting in a powder of high press density. FIG. 3 shows an FESEM image of the achieved powder.

Powder properties: Powder density was measured by pressing pellets. At 2000 kg/cm² a press density of 3.4-3.5 g/cm³ was achieved. The particle size distribution was bimodal, with centers at approx. 20 μm and 5 μm. Large particles had a composition of $LiCo_{1-x1}M_{x1}O_2$, small particles had a composition $LiCo_{1-x2}M_{x2}O_2$ with $M=Mn_{1/2}Ni_{1/2}$ and $x1 \cong 0.05$ and $x2 \cong 0.2$. The composition was checked by a suitable separation of large and small particles (for example by dispersing in a liquid), followed by ICP chemical analysis.

Figure 5:
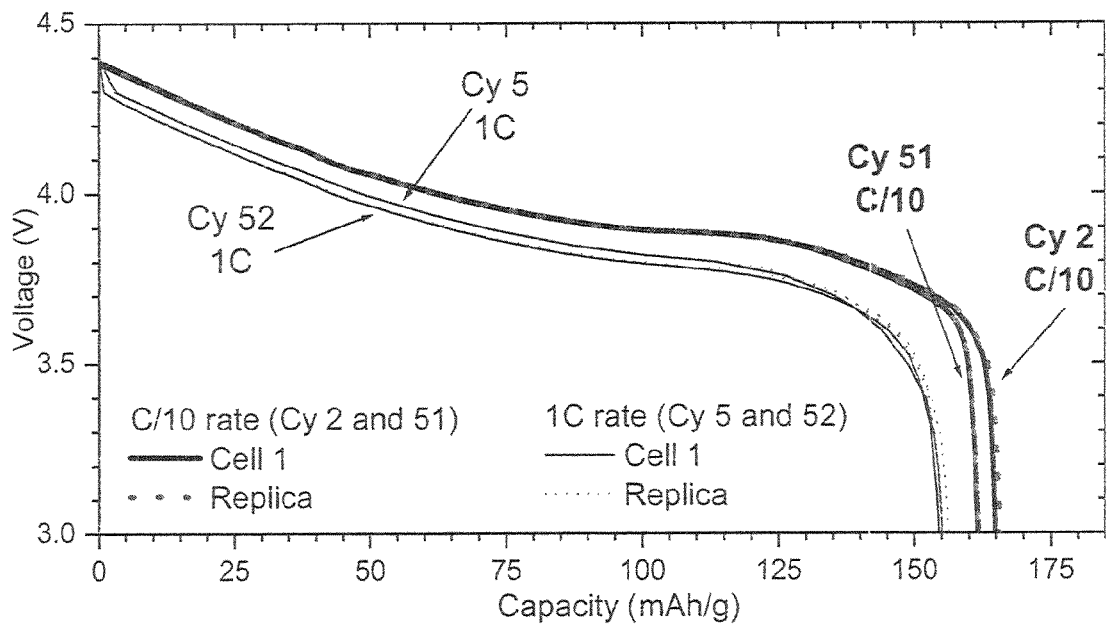
FIG. 5 is a graph showing cycling stability of the cathode active material of Example 1.

Electrochemical properties: Coin cells with Li anode were prepared using the above achieved bimodal cathode active material particles. The reversible capacity (C/10 rate, 4.4V) was >165 mAh/g. The rate performance (discharge to 3.0V) was satisfying, the ratio of capacities at 2C: C/5 rate was >93%. FIG. 4 shows the first cycle voltage profile and the rate performance discharge profiles. An excellent cycling stability was achieved at 4.4V. FIG. 5 compares the initial discharge profile at C/10 rate and 1C rate (cycle 2 and 5) with the discharge profiles at the same rate after extended cycling (cycle 51 and 52). At least 98% of capacity has remained. Very little impedance built-up was observed. Under similar conditions a reference cell with unmodified $LiCoO_2$ shows significant loss of capacity. DSC of charged electrodes shows significant changes compared to bare $LiCoO_2$.

Structural analysis: EDS mapping, quantitative analysis of EDS spectra of large and small particles, X-ray diffraction with careful Rietveld analysis of the cathode active material powder of Example 1 showed that a $LiCoO_2$ phase remains in the inside of larger particles, the outside being $LiCo_{1-2x}Mn_xNi_xO_2$ with $x \cong 0.13 \ldots 0.16$, smaller particles are monophase with $x > 0.16$.

Cost analysis: Example 1 prepared 3.7 kg of a cathode active material with an (approximate) averaged composition $LiCo_{0.8}Mn_{0.1}Ni_{0.1}O_2$. The preparation included a 2-step precipitation reaction using a 5 L reactor. The powder densities during processing were high (volumes were less than 1.5 L of powder (before adding $Li_2CO_3$) and less than 2 L powder (after $Li_2CO_3$ addition)). Waste was about 10 L of $Na_2SO_4$.

Comparative Example 1

Comparative example 1 was performed to demonstrate that the preparation of a cathode active material with particles having a size dependent composition according Example 1 was performed at low cost.

A typical precipitation reaction to produce complex cathode materials involves large liquid reactor volumes, large amounts of waste, and the loading of drying ovens, furnaces etc. is low.

For a comparison, the same equipment was used to prepare a uniform cathode material having the same composition $LiCo_{0.8}Mn_{0.1}Ni_{0.1}O_2$ ("118"). The preparation was similar as described in Example 1 with the following exceptions:
(a) the transition metal flow was transition metal sulfate (2M) not having the "110" but the "118" composition.
(b) no seed particles were applied.
(c) after precipitation, 0.53 mol $Li_2CO_3$ were added per 1 mol of the mixed transition metal hydroxide.

0.8 kg of final material was achieved. The powder densities during processing were low. The total involved powder volumes (before the heat treatment) exceeded the volumes of Example 1. The same total amount of waste was produced. Briefly, the cost of processing was the same as in example 1 but only 20% of the total mass was achieved.

Example 2

A $LiCoO_2$ powder, the powder containing a significant amount of larger (10-25 μm) and smaller particles (size 3-10 μm) was used as seed. The smaller particles had approx. 50% of the mass and they dominantly contribute to the surface area of the cathode active material. A cathode active material was prepared similar as described in Example 1 with the following exception:
(a) only 2 kg of seeds are used.
(b) 0.4 mol transition metal hydroxide is precipitated per 1 mol of $LiCoO_2$.
(c) the transition metal sulfate flow contained was not "110" but "331".
(d) the amount of $Li_2CO_3$ was adjusted (0.53 mols Li per 1 mol precipitate).

As a result a cathode active material powder was achieved where larger particles had an outer and inner phase. The inner phase had a composition near to $LiCoO_2$. The outer phase was basically $LiCo_{1-2x}Mn_xNi_xO_2$ with $x \cong 0.13 \ldots 0.16$. Small particles (<5 my) were single phase with $x > 0.3$. Intermediary sized particles were single phase with $0.15 < x < 0.3$.

Example 3

The cathode active material powder was prepared in the same manner as in Example 1 except that the sintering temperature was lowered to about 900° C., much less than 980° C. A cathode active material in many aspects similar to that of example 1 was achieved. The material of Example 3 was however different in two important aspects. First, the surface was rough, causing an increased surface area. Secondly, due to the less severe sintering, the surface contained less cobalt. Electrochemical testing showed high stability (less impedance built-up), and improved rate performance.

Example 4

The cathode active material powder was prepared in the same manner as in Example 1 except that the sintering temperature was increased to 1020° C., much more than 980° C. A cathode active material with a low surface area was achieved. Cathode particles with size dependent composition were achieved. Small and medium sized particles were one-phase, having the same composition in the outer and inner bulk. Large particles were two phase, the core being $LiCoO_2$, the shell being $LiMO_2$ with M approximately $M=Co_{1-2x}Mn_xNi_x$, $x \approx 0.2$.

Example 5

The cathode active material powder was prepared in the same manner as in Example 1 except that the co-precipitation reaction was modified so that additionally a thin "coating" layer was achieved. Typically, at the end of the precipitation, only for a limited time, soluble salts, or pigments of inactive elements were added to the reactor. Typical elements Were Al, Mg, Ti, Zr, Sn etc.

Example 6

2 kg of commercial $LiCoO_2$ (d10≅3 μm, d90≅12 μm) having potato shape morphology were coated by Mn—Ni-hydroxide similar as described in example 1. The precipitate was MOOH with $M=Mn_{1/2}Ni_{1/2}$. 0.25 mol MOOH was precipitated per 1 mol $LiCoO_2$.

A sample was prepared from 50 g of the precipitate coated $LiCoO_2$. 3.26 g $Li_2CO_3$ was added and mixed, and the mixture was heat treated at 800° C. in air. Then 1.275 g of a mixture (2:1 by weight) of $Li_3AlF_6$ and $Li_2CO_3$ was added to the sample. The mixture was heated to 920° C. for 2 hours.

Figure 6:
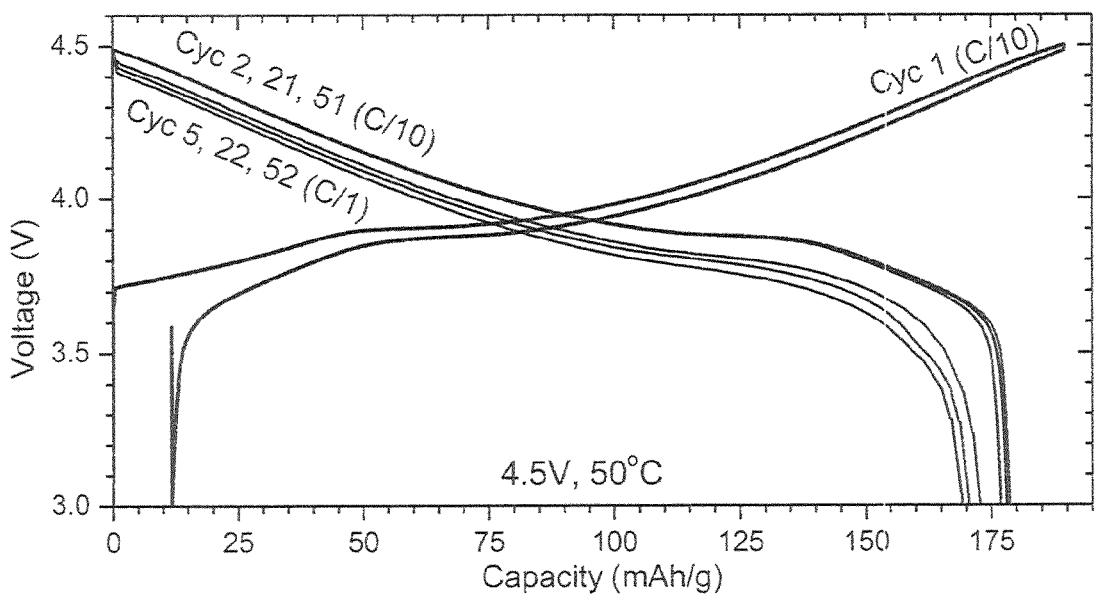
FIG. 6 is a graph showing cycling stability of the cathode active material of Example 6.

Coin cells were assembled (Li metal anode) and electrochemical tested. During most cycles the charge and discharge rate was C/5 (1C=150 mA/g). The charge voltage was 4.5V. FIG. 6 shows results obtained during cycling at 50° C. The cycling stability was excellent. At slow rate after 50 cycles, only about 1% of reversible capacity was lost. The built-up of impedance at higher rate was negligible.

The charge efficiency (averaged from cycle 9-20) exceeded 99.7%, proving a very low rate of electrolyte oxydation even under these rigid (high voltage of 4.5V and elevated temperature of 50° C.) testing conditions.

A uniform cathode material (coated $LiCoO_2$) showed clear deterioration during similar testing.

Example 7

5 kg of commercial $LiCoO_2$ having potato shape morphology with (d10≅3-4 μm, d90≅20-22 μm) was immersed to 1.6 l water. Into a reactor (5 L) a flow of NaOH (4M) and a flow of $MSO_4$ (2M), $M=Mn_{1/2}Ni_{1/2}$ were continuously added during rigid stirring. The flow rates were adjusted to remain in a preferred pH region. The temperature was ≅90° C. The precipitation reaction continued for 2 h 45 min. 0.07 mol MOOH was precipitated per 1 mol $LiCoO_2$. The solution was decanted and replaced by 0.5M LiOH, the solid equilibrated in the LiOH solution over night. After washing and filtering, the sample was dried at 180° C.

100 g of the precursor was mixed with 1.6 g $Li_2CO_3$ and 0.51 g of a 2:1 mixture of $Li_3AlF_6$ and $Li_2CO_3$, followed by a heat treatment at 900° C.

Coin cells were assembled (Li metal anode) and electrochemical tested. During most cycles the charge and discharge rate was C/5 (1C-150 mA/g). The charge voltage was 4.5V. Testing occurred at 60° C. The obtained reversible capacity was 190 mAh/g. The cycling stability was excellent. Reversible capacity was lost at a rate of approx. 6% per 100 cycles. A high charge efficiency of >99.6% (averaged during cycle 10-20) was achieved, proving a very low rate of electrolyte oxydation even under these very rigid (high voltage of 4.5V and elevated temperature of 60° C.) testing conditions.

A uniform cathode material (coated $LiCoO_2$) showed strong deterioration during similar testing.

What is claimed is:

1. A powderous electrode active material comprising:
a lithium transition metal oxide $Li_aM_bO_2$,
where $0.9<a<1.1$, $0.9<b<1.1$ and M comprises $Mn_xNi_yCo_{1-x-y}$, $0\leq y\leq 1$, $0\leq x\leq 1$, said material having particles with a distribution of sizes, and
where the content of Mn, Co and Ni in M varies with the size of the particles.

2. The powderous electrode active material according to claim 1, having a broad particle size distribution specified that the size ratio of large to small particles exceeds 2, d90/d10>2 where d90, the size of large particles is defined that particles with larger size constitute a fraction of 10% of the total mass of the powder and d10, the size of small particles is defined that particles with smaller size constitute a fraction of 10% of the total mass of the powder.

3. The powderous electrode active material according to claim 1, where $M=A_zA'_{z'}M'_{1-z-z'}$, $M'=Mn_xNi_yCo_{1-x-y}$, $0\leq y\leq 1$, $0\leq x\leq 1$, $0\leq z+z'<0.1$, $z'<0.02$, A is a metal chosen from Al, Mg, Ti, Cr and A' is a further minor dopant chosen from the group consisting of F, Cl, S, Zr, Ba, Y, Ca, B, Be, Sn, Sb, Na, and Zn.

4. The powderous electrode active material according to claim 1, wherein the particles have a layered crystal structure.

5. A powderous electrode active material comprising:
a lithium transition metal oxide $Li_aM_bO_2$,
where $0.9<a<1.1$, $0.9<b<1.1$ and M comprises $Mn_xNi_yCo_{1-x-y}$, $0\leq y\leq 1$, $0\leq x\leq 1$,
said material having particles with a layered crystal structure, and having a broad particle size distribution with d90/d10>2, and
where the content of Mn, Co and Ni in M varies with the size of the particles.

6. The powderous electrode active material of $Li_aM_bO_2$ with size dependent composition according to claim 5, wherein the averaged transition metal composition is $M=Mn_xNi_y(Co_{1-x-y})$ with $0.35>x>0.03$.

7. The powderous electrode active material of $Li_aM_bO_2$ with size dependent composition according to claim 5, wherein the averaged transition metal composition is $M=Mn_xNi_y(Co_{1-x-y})$ with $x>0.03$ and $x+y<0.7$.

8. The powderous electrode active material of $Li_aM_bO_2$ with size dependent composition according to claim 1, where basically all bulk of all particles has a layered crystal structure, larger particles having a composition $Li_aM_bO_2$ where $M=Mn_xNi_y(Co_{1-x-y})$ with $x+y<0.35$ and smaller particles having a different composition $Li_aM_bO_2$ where $M=Mn_{x'}Ni_{y'}(Co_{1-x'-y'})$ with at least 10% less cobalt $(1-x'-y')<0.9*(1-x-y)$ and at least 5% more manganese $x'-x>0.05$.

9. The powderous electrode active material according to claim 8, wherein larger particles, specified by having a size larger than d50—these larger particles comprise a mass fraction exceeding 50% of the total mass of the powder—have a different composition in the inner bulk and the outer bulk.

10. The powderous electrode active material according to claim 9, wherein the inner bulk of larger particles has a composition $Li_aM_bO_2$ where $M=Mn_xNi_y(Co_{1-x-y})$ and $x<0.2$.

11. The powderous electrode active material according to claim 9, wherein the inner bulk of larger particles has a composition $Li_aM_bO_2$ where $M=Mn_xNi_yCo_{1-x-y}$ with $x+y<0.2$.

12. The powderous electrode active material according to claim 9, wherein the inner bulk of larger particles has a higher stoichiometry of cobalt and a lower stoichiometry of manganese than the outer bulk.

13. The powderous electrode active material of $Li_aM_bO_2$ with size dependent composition according to claim 5, where basically all bulk of all particles has a layered crystal structure, larger particles having a composition $Li_aM_bO_2$ where $M=Mn_xNi_y(Co_{1-x-y})$ with $x+y<0.35$ and smaller particles having a different composition $Li_aM_bO_2$ where $M=Mn_{x'}Ni_{y'}(Co_{1-x'-y'})$ with at least 10% less cobalt $(1-x'-y')<0.9*(1-x-y)$ and at least 5% more manganese $x'-x>0.05$.

14. The powderous electrode active material according to claim 13, wherein larger particles, specified by having a size larger than d50—these larger particles comprise a mass fraction exceeding 50% of the total mass of the powder—have a different composition in the inner bulk and the outer bulk.

15. The powderous electrode active material according to claim 12, wherein the inner bulk of larger particles has a composition $Li_aM_bO_2$ where $M=Mn_xNi_y(Co_{1-x-y})$ and $x+y<0.2$.

16. The powderous electrode active material according to claim 14, wherein the inner bulk of larger particles has a composition $Li_aM_bO_2$ where $M=Mn_xNi_yCo_{1-x-y}$ with $x+y<0.2$.

17. The powderous electrode active material according to claim 14, wherein the inner bulk of larger particles has a higher stoichiometry of cobalt and a lower stoichiometry of manganese than the outer bulk.

18. The powderous electrode active material according to claim 5, wherein the content of Mn, Co and Ni in M varies continuously with the size of the particles.

19. The powderous electrode active material according to claim 1, where the Co stoichiometry of single particles continuously increases with the particle size.

20. The powderous electrode active material according to claim 1, where the Mn stoichiometry of single particles continuously decreases with the particle size.

21. The powderous electrode active material according to claim 20, wherein the manganese stoichiometry is proportional to the inverse of the radius of the particle.

22. The powderous electrode active material according to claim 5, where the Co stoichiometry of single particles continuously increases with the particle size.

23. The powderous electrode active material according to claim 5, where the Mn stoichiometry of single particles continuously decreases with the particle size.

24. The powderous electrode active material according to claim 23, wherein the manganese stoichiometry is proportional to the inverse of the radius of the particle.

25. The powderous electrode active material according to claim 1, which is used as cathode active material in a rechargeable lithium batteries.

26. The powderous electrode active material according to claim 5, which is used as cathode active material in a rechargeable lithium batteries.

27. A method for preparing the powderous electrode active material of claim 1, the method comprising the steps of:
    precipitating at least one transition metal containing precipitate onto seed particles, which have a different transition metal composition than the precipitate;
    adding a controlled amount of a source of lithium; and
    performing at least one heat treatment,
    wherein basically all obtained particles contain a core, originating from a seed, completely covered by a layer originating from precipitate.

28. The method according to claim 27, wherein the precipitate contains manganese, and the seeds dominantly are monolithic particles chosen from $LiCoO_2$ or $LiMO_2$ where M is transition metal $M=Mn_xNi_yCo_{1-x-y}$, where x<0.25 and y<0.9.

29. The method according to claim 28, wherein at least 40 w % of the transition metal of the precipitate is manganese.

30. The method according to claim 28, wherein the outer layer originating from the precipitate contains further at least one metal element chosen from the group consisting of Al, Mg, Ti, Zr, Sn, Ca and Zn.

31. The method according to claim 27, wherein the heat treatment is made in air, the temperature being within the range from 750 to 1050° C.

32. A method for preparing the powderous electrode active material of claim 1, the method comprising the steps of:
    precipitating at least one transition metal containing precipitate onto seed particles, which have a different transition metal composition than the precipitate;
    adding a controlled amount of a source of lithium; and
    performing at least one heat treatment,
    wherein basically all obtained particles contain a core, originating from a seed, completely covered by a layer originating from precipitate.

33. The method according to claim 32, wherein the precipitate contains manganese, and the seeds dominantly are monolithic particles chosen from $LiCoO_2$ or $LiMO_2$ where M is transition metal $M=Mn_xNi_yCo_{1-x-y}$, where x<0.25 and y<0.9.

34. The method according to claim 33, wherein at least 40 w % of the transition metal of the precipitate is manganese.

35. The method according to claim 33, wherein the outer layer originating from the precipitate contains further at least one metal element chosen from the group consisting of Al, Mg, Ti, Zr, Sn, Ca and Zn.

36. The method according to claim 32, wherein the heat treatment is made in air, the temperature being within the range from 750 to 1050° C.

* * * * *